United States Patent
Walker

(10) Patent No.: US 7,299,170 B2
(45) Date of Patent: Nov. 20, 2007

(54) METHOD AND APPARATUS FOR THE EMULATION OF HIGH PRECISION FLOATING POINT INSTRUCTIONS

(75) Inventor: Paul Walker, Lancs (GB)

(73) Assignee: Transitive Limited (GB)

( * ) Notice: Subject to any disclaimer, the term of this patent is extended or adjusted under 35 U.S.C. 154(b) by 639 days.

(21) Appl. No.: 10/726,858

(22) Filed: Dec. 2, 2003

(65) Prior Publication Data

US 2004/0268324 A1    Dec. 30, 2004

(30) Foreign Application Priority Data

Jun. 28, 2003  (GB)  ................. 0315350.9
Sep. 24, 2003  (GB)  ................. 0322325.2

(51) Int. Cl.
    *G06F 9/455*    (2006.01)
(52) U.S. Cl. ............................. 703/26; 703/23; 703/24; 708/495
(58) Field of Classification Search .................. 703/26, 703/23, 24; 708/495
    See application file for complete search history.

(56) References Cited

U.S. PATENT DOCUMENTS

| | | | |
|---|---|---|---|
| 5,341,320 A * | 8/1994 | Trissel et al. ................ | 708/498 |
| 5,631,859 A * | 5/1997 | Markstein et al. ........... | 708/513 |
| 5,678,016 A | 10/1997 | Eisen et al. | |
| 5,732,005 A | 3/1998 | Kahle | |
| 5,764,959 A | 6/1998 | Sharangpani et al. | |
| 6,138,135 A | 10/2000 | Karp | |
| 6,163,764 A * | 12/2000 | Dulong et al. ................ | 703/26 |
| 6,282,634 B1 | 8/2001 | Hinds et al. | |
| 6,697,832 B1 * | 2/2004 | Kelley et al. ................ | 708/501 |

FOREIGN PATENT DOCUMENTS

GB    2 294 565 A    5/1996

OTHER PUBLICATIONS

Arakawa F., "SH4 RISC Multimedia Microprocessor," IEEE Micro, Mar./Apr. 1998, pp. 26-34, vol. 18-issue 2.

* cited by examiner

*Primary Examiner*—Kamini Shah
*Assistant Examiner*—Herng-der Day
(74) *Attorney, Agent, or Firm*—Wilmer Cutler Pickering Hale and Dorr LLP

(57) ABSTRACT

A high precision floating point emulator and associated method for emulating subject program code on a target machine where the subject machine base operands possess a different precision than the target machine. The high precision floating point emulator is provided for the emulation of subject program code instructions having a higher precision than that supported by the target machine architecture by utilizing intermediate calculations having values with a higher precision than that supported by the target machine.

27 Claims, 2 Drawing Sheets

METHOD AND APPARATUS FOR THE EMULATION OF HIGH PRECISION FLOATING POINT INSTRUCTIONS

BACKGROUND OF THE INVENTION

1. Technical Field

The subject invention relates generally to the field of computers and computer software and, more particularly, to an apparatus and method for emulating high precision floating point instructions.

2. Description of Related Art

Floating point notation is widely used in digital data processing devices, such as microprocessors, to represent a much larger range of numbers than can be represented in regular binary notation. Various types of floating point notations are used. Typically, a floating point number has a sign bit (s), followed by an exponent field (e) and a mantissa field.

Microprocessors typically contain and work together with floating point units (FPU) to perform operations, such as addition and subtraction, on floating point numbers. FPUs have the ability to support complex numerical and scientific calculations on data in floating point format. In order to add or subtract floating point numbers, the decimal points must be aligned. The process is equivalent to addition or subtraction of base ten numbers in scientific notation. Generally, the FPU performs operations on the exponents and mantissas of the values in order to align the decimal points.

Once the decimal points are aligned, the mantissas can be added or subtracted in accordance with the sign bits. The result may need to be normalized, or left shifted, so that a one is in the most significant bit position of the mantissa. The result may also be rounded. Many different representations can be used for the mantissa and exponent themselves, where IEEE Standard 754, entitled "IEEE Standard for Binary Floating point Arithmetic (ANSI/IEEE Std 754-1985), provides a standard used by many CPUs and FPUs which defines formats for representing floating point numbers, representations of special values (e.g., infinity, very small values, NaN), exceptions, rounding modes, and a set of floating point operations that will work identically on any conforming system. The IEEE 754 Standard further specifies the formats for representing floating point values with single-precision (32-bit), double-precision (64-bit), single-extended precision (up to 80-bits), and double-extended precision (128-bit).

Most microprocessors also typically include integer units for performing integer operations. An integer unit is typically provided to perform integer operations, such as addition and subtraction. While integer units are common in microprocessors, floating point arithmetic performed using integer operations is much more costly than the equivalent floating point operations. Thus, most microprocessor utilize a combination of FPUs and integer units to perform necessary calculations. The precision capable of being achieved in such calculations is determined by the actual architecture of the FPU and integer unit hardware associated with the microprocessor.

Across the embedded and non-embedded CPU market, one finds predominant Instruction Set Architectures (ISAs) for which large bodies of software exist that could be "Accelerated" for performance, or "Translated" to a myriad of capable processors that could present better cost/performance benefits, provided that they could transparently access the relevant software. One also finds dominant CPU architectures that are locked in time to their ISA, and cannot evolve in performance or market reach and would benefit from "Synthetic CPU" co-architecture.

It is often desired to run program code written for a computer processor of a first type (a "subject" processor) on a processor of a second type (a "target" processor). Here, an emulator or translator is used to perform program code translation, such that the subject program is able to run on the target processor. The emulator provides a virtual environment, as if the subject program were running natively on a subject processor, by emulating the subject processor. The precision of the calculations which can be performed on the values of the subject program have conventionally been limited by the hardware architecture of the target processor.

SUMMARY

The following is a summary of various aspects and advantages realizable according to various embodiments of the improved architecture for program code conversion according to the present invention. It is provided as an introduction to assist those skilled in the art to more rapidly assimilate the detailed discussion of the invention that ensues and does not and is not intended in any way to limit the scope of the claims that are appended hereto.

In particular, the inventors have developed an improved method and apparatus for expediting program code conversion, particularly useful in connection with an emulator which emulates subject program code on a target machine where the subject machine base operands possess a different precision than the target machine. More particularly, a high precision floating point emulator is provided for the emulation of subject program code instructions having a higher precision than that supported by the target machine architecture by utilizing intermediate calculations having values with a higher precision than that supported by the target machine.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide an improved high precision floating point emulation apparatus.

Figure 1:
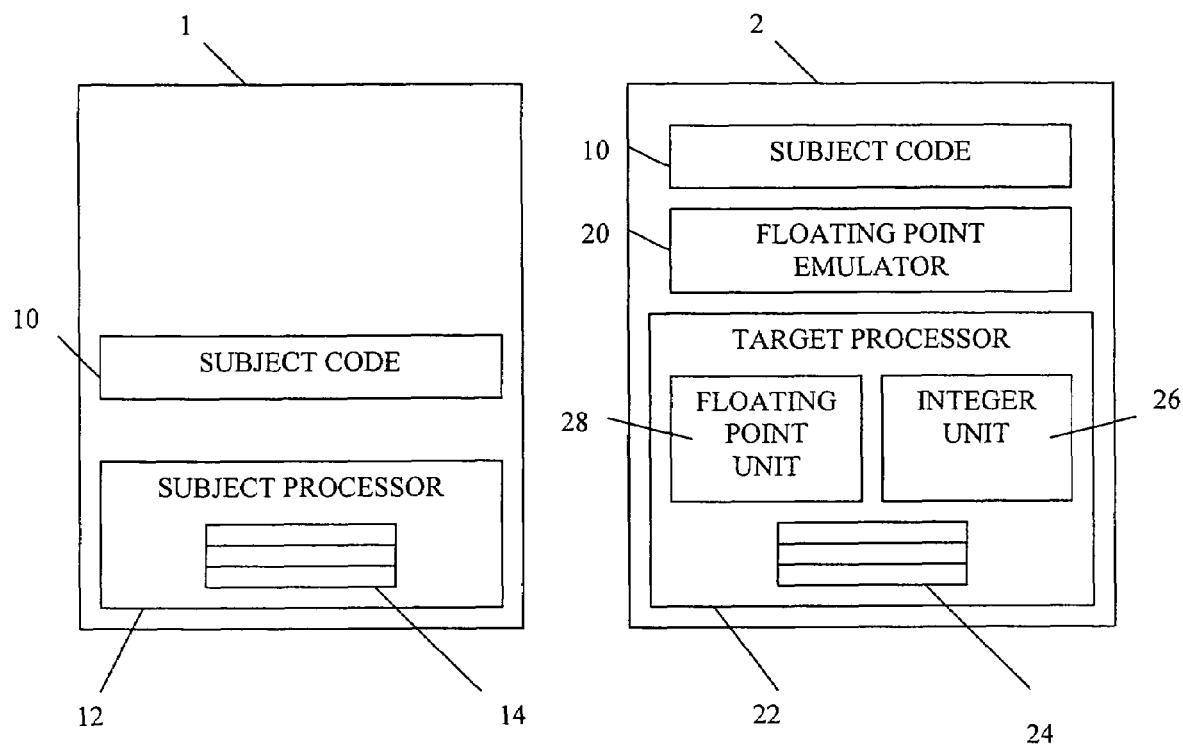
FIG. 1 shows a computing environment including subject and target processor architectures.

Referring to FIG. 1, an example computing environment is shown including a subject computing environment 1 ("subject machine 1") and a target computing environment 2 ("target machine 2"). In the subject machine 1, subject code 10 is executable natively on a subject processor 12. The subject processor 12 includes a set of subject registers 14. Here, the subject code 10 may be represented in any suitable language with intermediate layers (e.g., compilers) between the subject code 10 and the subject processor 12, as will be familiar to a person skilled in the art.

It is desired in some situations to run the subject code 10 on the target machine 2 of the present invention, which includes a target processor 22 using a set of target registers 24. The two processors 12 and 22 of the subject machine 1 and the target machine 2, respectively, may be inherently non-compatible, such that these two processors 12 and 22 use different instruction sets. The target processor 22 includes a floating point unit 28 for computing floating point operations and an integer unit 26 for performing integer operations. The floating point unit 28 and the integer unit 26 may comprise any of a wide variety of types of hardware units, as known to those skilled in the art, where the floating point unit 28 is preferably IEEE 754 Standard compatible floating point hardware.

The two processors 12 and 22 may operate with different levels of accuracy and precision depending upon their particular architectures as well as the hardware designs of their respective floating point unit 28 and the integer unit 26. Hence, a floating point emulator 20 is provided in the target machine 2, in order to emulate high precision instructions from the subject code 10 in the target computing environment 2. High precision refers to a level of precision which is higher than that provided by the target machine 2, where the base operands in instructions of the subject program code have a higher precision than that supported by the target machine 2. The floating point emulator 20 provides for a higher level of precision during calculations than the target architecture 2 could otherwise provide, thus providing a higher level of accuracy in the emulated instructions.

The floating point emulator 20 is preferably a software component, i.e., a compiled version of the source code implementing the emulator, run in conjunction with an operating system running on the target processor 22, typically a microprocessor or other suitable processing device. It will be appreciated that the structure illustrated in FIG. 1 is exemplary only and that, for example, software, methods and processes according to the invention may be implemented in code residing within or beneath an operating system.

Figure 2:
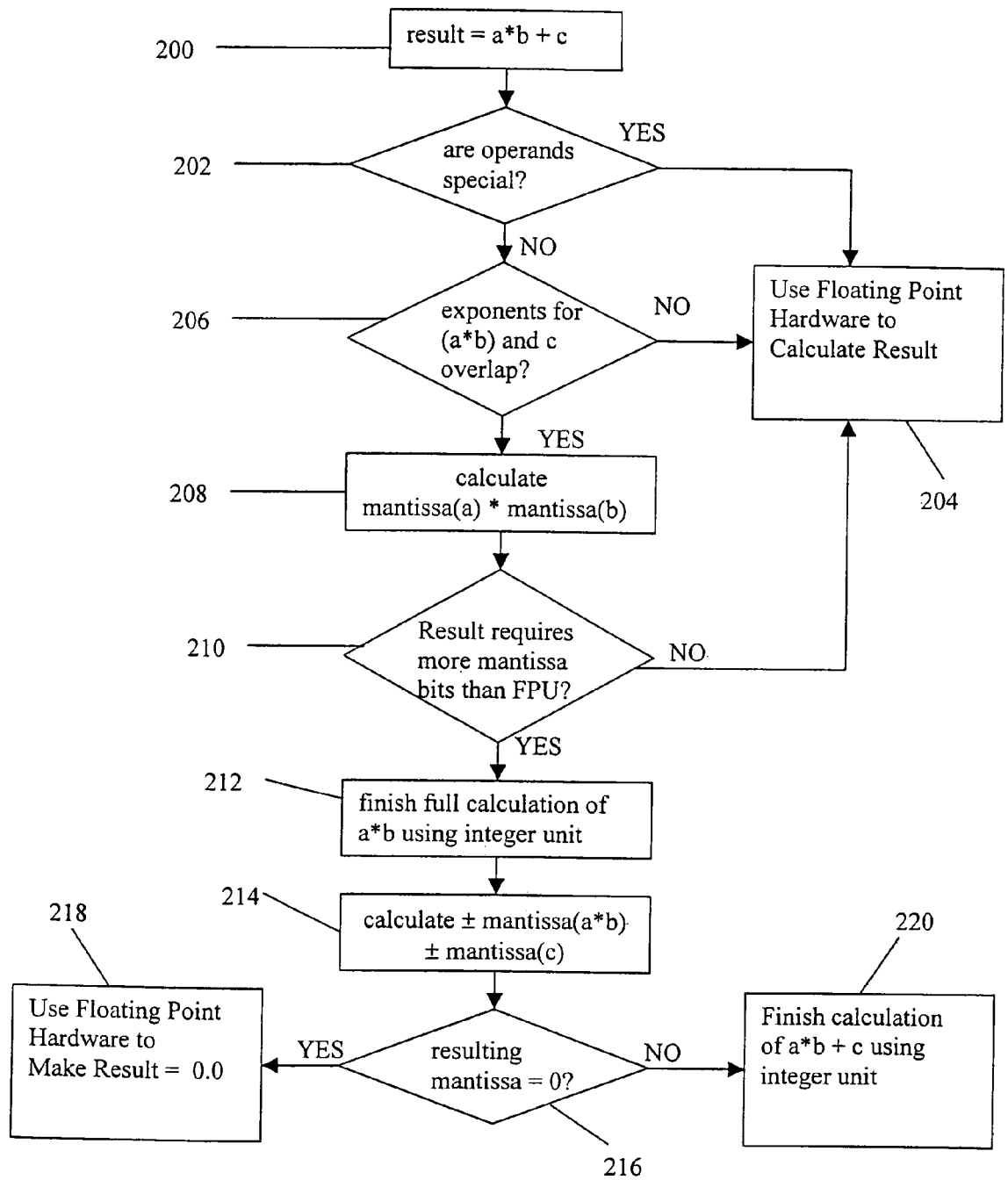
FIG. 2 is an operational flow diagram that describes an example of the high precision floating point emulation performed in accordance with a preferred embodiment of the present invention.

Referring now to FIG. 2, an operational flow diagram of a method of performing high precision floating point emulation in accordance with a preferred embodiment of the present invention is illustrated. The high precision floating point emulation algorithm described hereafter refers to a single embodiment of the invention that provides for the emulation of high precision floating point accumulated instructions, while it is understood that the floating point emulator 20 is capable of emulating any types of instructions where the subject machine 1 base operands are at a different precision than the target machine 2. For example, the floating point emulator 20 would allow the emulation of the addition of two double precision values, such as a subject machine's Double(x)+Double(y) operation, on a target machine 2 that only supports single precision floating point operations. With this understanding and for ease of discussion, the high precision floating point emulation algorithm will be described hereafter with reference to the emulation of high precision floating point accumulated instructions of the form:

$$d = \pm(a*b \pm c)$$

where a, b, c and d are operands which can be expressed as floating point numbers. High precision as referred to in this description means any precision which is higher than that provided by the target machine 2. For instance, if the architecture of the target machine 2 supports IEEE Standard 754 double-precision floating point values, then high precision would refer to any values having a higher precision than double-precision floating point values. It should be noted that the floating point emulator 20 only calculates the intermediate values of the accumulated instructions at high precision, and the operands themselves and the result are not at high precision.

The high precision floating point algorithm embodied in FIG. 2 utilizes standard integer techniques to perform the calculation of the accumulated instructions in stages, where, at the end of each stage, the intermediate values are tested at runtime to ascertain whether the intermediate values have reached a point at which the hardware (i.e., the target processor 22, integer unit 26, and floating point unit 28) of the target machine 2 has enough precision to finish the calculation without loss of accuracy. To achieve this, the high precision floating point algorithm performed by the floating point emulator 20 works in combination with an integer unit 26 and an IEEE Standard 754 compatible floating point hardware unit 28.

A wide number of integer techniques for performing floating point emulation are known to those skilled in the art, where the high precision floating point algorithm of the preferred embodiment described herein accelerates the process by using floating point hardware, namely floating point unit 28. These process accelerations are referred to as fast exit points hereinafter, because they exit the testing routine performed at runtime to determine if the intermediate values are at a level such that the target architecture 2 has enough precision to finish the calculation without loss of accuracy and the hardware of the target architecture 2 is immediately used to perform the necessary calculations.

Fast Exit Points

The floating point emulator 20 begins the high precision floating point algorithm when a floating point accumulated instructions of the form: $d = \pm(a*b \pm c)$ is encountered in step 200. It is determined in step 202 if any of the three input operands (a, b, c) can be considered a special value, where special values include zero, infinity or NAN (not a number). For each of these special values, there is a known result, such as dictated by the IEEE Standard 754, that all compatible hardware will produce regardless of the level of precision and hence there is no need for expensive integer emulation. Thus, there is a fast exit point for any operands identified as special values to perform the calculation using the target architecture's floating point unit 28 in step 204.

If none of the operands (a, b, c) are special values, it is next determined in step 206 whether the exponent for the result of the multiplication (a*b) overlaps with the exponent of operand c. Two values will overlap if the addition/subtraction of the significant digits of the two values yields a result different from each of the two values. In this context, non-overlapping refers to the fact that either a*b or c is so large as to make the other insignificant. By way of example, in the situation where a particular FPU is only capable of representing 3 significant digits. If the value 3.10 is added to the value to 0.01, then it can be seen that both values are important to the result, i.e., performing the addition will yield a result different to the sources and the sources thus overlap. Contrarily, for the same FPU only capable of representing 3 significant digits, if the value 310 is added to the value 0.01, the result when using 3 significant figures is 310. Thus, in this situation the result is the same as the first source and the two values did not overlap.

When the two values fail to overlap, the addition of the values is not required. Thus, if the exponent for the result of the multiplication (a*b) does not overlap with the exponent of operand c, then the floating point algorithm determines that the addition/subtraction is not required and another fast exit point is provided where the calculation can be performed using the target machine 2's FPU 28 in step 204. It should be noted that thresholds for determining whether two values overlap can either be variably selected or can be thresholds established by formats well-known to those skilled in the art can be utilized, such as the IEEE Standard 754 floating point double-precision format.

When the exponents of the result of (a*b) and c do overlap, the mantissa for the result of the multiplication (a*b) is calculated in step 208 in order to establish how much precision is required by the mantissa. It is determined in step 210 whether the result of the multiplication (a*b) requires more mantissa bits than is provided by the FPU 28 of the target machine 2. For example, when the FPU 28 is capable of handling double-precision numbers, it is known that operands containing 52 mantissa bits are utilized for double-precision values. If the number of bits required by the mantissa(a*b) is less than or equal to the number of mantissa bits capable of being handled by the FPU 28 (e.g., 52 bits in the case of double-precision numbers), then the FPU 28 has sufficient precision to perform the calculation. Thus, if the mantissa(a*b) requires no more mantissa bits than are provided for by the FPU 28, another fast exit point is provided and the result is calculated using the target architecture's FPU 28 in step 204. In the determination made in step 210, the precision is determined by comparing the spread of the mantissa, namely the number of bit positions between the most and least significant set bits.

When the mantissa(a*b) requires more bits than provided by the FPU 28, the full calculation of a*b is completed using the integer unit 26 in step 212. At this point, the high precision floating point algorithm calculates the ±mantissa (a*b)±mantissa(c) in step 214. A determination is made in step 216 whether the resulting mantissa is equal to zero, where upon another fast exit point can be created to use the target architecture 2's most efficient mechanism, namely the FPU 28, to set the final result to 0.0 in step 218. Thus, this fast exit point is only valid when the mantissa(a*b) and the mantissa(c) are subtracted from one another to yield a resulting mantissa equal to zero. This removes the need to calculate the final exponent and also bypasses any expensive rounding. However, if the final resulting mantissa is not equal to zero, then the remaining parts of the calculation of a*b+c must be calculated using the integer unit 26 in step 220.

The various fast exit point provided in the high precision floating point algorithm described above provide for faster and more efficient emulation of accumulated instructions by maximizing the use of the FPU 28 for performing floating point arithmetic. By implementing the high precision floating point algorithm of the preferred embodiment, accumulated instructions are calculated at a higher precision than the operands are typically capable of being handled by the architecture of the target machine 2, resulting in accumulated instructions effectively being calculated with greater precision. If the intermediate result is twice the precision of the sources, then the accumulated instructions can be calculated to an infinite precision (i.e., no loss of accuracy).

For the purposes of illustrating the steps performed by the floating point emulator 20 in implementing the above-described high precision floating point algorithm, the following example is provided without any intention by the inventors of the present invention to limit the scope of their invention to the described example.

This example utilizes an accumulated instruction having three IEEE Standard 754 double precision floating point values for operands (a, b, c). The IEEE Standard 754 standard dictates that a double-precision floating point value is 64 bits wide, including 1 sign bit, an 11-bit exponent, and a 52-bit mantissa). The example uses the definitions in the following legend:

| Legend | |
|---|---|
| a, b, c | the input operands |
| a * b, a * b − c | the intermediate operands |
| sign(x) | the sign part of the operand x, represented as a Boolean value |
| exp(x) | the exponent part of operand x, represented as an integer |
| man(x) | the mantissa part of the operands x including the implied one, represented as a larger integer |
| FPU(x) | calculate x using the targets floating point unit 28 and exit. These are indicative of a fast exit point. |
| sub(x, y) | x − y |
| mul(x, y) | x * y |
| shift_right(x, y) | Shift x y places to the right |

In this example, a large integer means larger than that provided by the hardware of the target architecture. The last three operations in the legend are represented as functions as they operate on large integers.

The pseudo-code for the high precision floating point algorithm for the accumulated instruction fmsub (i.e., a*b− c) is as follows. Initially, it is determined if any of the operands are special to apply an early exit:

```
If (a or b or c) == (± infinity or 0.0 or NAN)
    FPU(a * b − c)
EndIf
```

When the operands are not special, it must then be determine whether to apply a different early exit by determining if the subtraction operation is significant, i.e., it has an effect on the final result within the required emulation accuracy or SMA (Subject Machine Accuracy).

Considering (a*b)−c, the subtraction would not be significant for the following two cases:
i) (a*b)−c==(a*b): SMA
ii) (a*b)−c==−c: SMA The particular emulation must be taken into account to determine whether accuracy of the SMA is similar to that of the Target Machine Accuracy (TMA). For instance, for the PPC-P4 emulation, it follows that if the subtract operation is insignificant in SMA then it is also insignificant in TMA.

A quick and efficient way to test for significance is to test for the mere possibility of the subtract operation affecting the result within the greater SMA. If it is determined that the result does not change within SMA, the calculation can be performed natively in TMA without precision loss. However, if there is a chance that the subtract operation could change the result in a change in SMA, the emulation performed by the high precision floating point algorithm continues.

For subtraction, the operand with the lower exponent is first shifted to make its exponent the same as the larger exponent. The mantissas are then subtracted and the exponent remains the same. For the operand with the lower exponent, the initial exponent shift upwards results in the mantissa being shifted downwards. If this results in a zero mantissa then the subtract operation is not significant. A zero mantissa will be produced if the exponent needs to be raised more than the number of bits of accuracy in the mantissa. Thus,

```
if ((higherExp − lowerExp) > Mantissa Bits)
    Subtraction not significant
else
    Subtraction possibly significant
fi
```

Considering the PPC instruction, fmsub, (a*b)−c, the intermediate result of the multiply is accurate to 106 mantissa bits and the final result of the subtraction is accurate to 53 mantissa bits. Therefore a*b has a maximum 106 mantissa bits and c has a maximum 53 mantissa bits.

For PPC, the above pseudo code now becomes:

```
if(exp(a * b) > exp(c))
    if(exp(a * b) − exp(c) > 53)
        // Subtraction not significant, take fast exit
        FPU(a * b − c)
    else
        // Subtraction possibly significant, continue emulation
    fi
else // exp(a * b) <= exp(c)
    if(exp(c) − exp(a * b) > 106)
        // Subtraction not significant, take fast exit
        FPU(a * b − c)
    else
        // Subtraction possibly significant, continue emulation
    fi
fi
```

The calculation of exp(a*b) involves the quick addition, exp(a)+exp(b). This fast exit check can therefore be done before the expensive SMA multiplication of a and b. The mantissa of a*b is then calculated:

```
man(a * b) = mul(man(a), man(b))
```

It is known that a double-precision floating point value has 52 bits for its mantissa (plus the implied 1), thus man(x) is 53 bits wide. The result of the multiplication will therefore be a maximum of 106 bits wide. It is then determined if the extra precision is required by examining the spread of the resulting mantissa. If this mantissa would fit within a float double (i.e., 53 bits including the implied one), then the extra precision is not required. This is tested by checking to see if the bottom 53 bits of the resulting mantissa were used.

```
If ((man(a * b) & 0x1fffffffffff) == 0)
    FPU(a * b − c)
EndIf
exp(a * b) = exp(a) + exp(b)
sign(a * b) = sign(a) xor sign(b)
```

It is now necessary to align a*b and c, in order to perform the subtraction.

```
If (exp(a * b) > exp(c))
    shift_right(man(c), exp(a * b) − exp(c))
    exp(a * b − c) = exp(a * b)
Else
    shift_right(man(a * b), exp(c) − exp(a * b))
    exp(a * b − c) = exp(c)
EndIf
If (man(a * b) > man(c))
    sub(man(a * b), man(c))
    sign(a * b − c) = sign(a * b)
Else
    sub(man(c), man(a * b))
    sign(a * b − c) = sign(c)
EndIf
```

The resulting mantissa is then checked to see if it equals zero

```
If (man(a * b − c) == 0)
    FPU(0.0)
EndIf
```

At this point, emulation has either exited via a fast exit point or it has been determined that the full precision is required. The result sign, exponent and mantissa have all been calculated, where the only operation remaining is to convert the result into the subject machine's floating point format, which involves aligning the result and rounding.

As can be seen from the foregoing, an emulator described in the various embodiments above provide for the high precision emulation of subject program code on a target machine where the subject machine base operands possess a different precision than the target machine. Moreover, the emulation of subject program code instructions having a higher precision than that supported by the target machine architecture is provided by utilizing intermediate calculations having values with a higher precision than that supported by the target machine.

The different structures of the high precision floating point emulation apparatus and method of the present invention are described separately in each of the above embodiments. However, it is the full intention of the inventors of the present invention that the separate aspects of each embodiment described herein may be combined with the other embodiments described herein. Those skilled in the art will appreciate that various adaptations and modifications of the just described preferred embodiments can be configured without departing from the scope and spirit of the invention. Therefore, it is to be understood that, within the scope of the appended claims, the invention may be practiced other than as specifically described herein.

What is claimed is:

1. A method of performing high precision emulation of program code instructions for a subject machine on a target machine including floating point hardware and integer hardware, the method comprising:

determining that operands in instructions of the program code for the subject machine require a higher precision than provided for by the hardware of the target machine; and applying a floating point emulation algorithm to perform intermediate calculations on the operands of the instructions at a higher precision than the precision supported by the hardware of the target machine to produce intermediate values;

wherein at each stage, the intermediate values are tested to determine whether the intermediate values have reached a point at which the hardware of the target machine has enough precision to finish the calculation without loss of accuracy, such that when it is determined based upon the intermediate calculations that the floating point hardware of the target machine provides sufficient precision to finish the calculations required by the instructions without loss of accuracy, the floating point hardware on the target machine is utilized to finish the calculations; and the integer hardware on the target machine is utilized to perform calculations not selected to be performed by the floating point hardware.

2. The method of claim 1, wherein the program code instructions are accumulated instructions that are calculated at a higher precision than the operands capable of being handled by the target machine.

3. The method of claim 2, wherein the program code instructions are floating point accumulated instructions of the form: $d=\pm(a*b\pm c)$, wherein a, b, c and d are operands expressible as floating point numbers.

4. The method of claim 3, further comprising identifying whether any of the operands (a, b, or c) are special values having a known result that all compatible hardware will produce regardless of the level of precision of said compatible hardware.

5. The method of claim 4, wherein said special values include either zero, infinity, or NaN (not a number), wherein the floating point hardware is utilized to calculate the result of the accumulated instructions when any of the operands (a, b, or c) are identified as special values.

6. The method of claim 3, wherein said floating point emulation algorithm further comprises:

determining whether the exponent for the result of the multiplication of (a*b) overlaps with the exponent of c; and utilizing the floating point hardware to calculate the result of the accumulated instructions when the exponent for the result of the multiplication of (a*b) fails to overlap with the exponent of c.

7. The method of claim 6, wherein, when the exponent for the result of the multiplication of (a*b) overlaps with the exponent of c, said floating point emulation algorithm further comprising:

determining whether the mantissa for the result of the multiplication (a*b) requires more mantissa bits than provided for by said floating point hardware; and utilizing the floating point hardware to calculate the result of the accumulated instructions when the result of the multiplication (a*b) does not require more mantissa bits than provided for by the floating point hardware.

8. The method of claim 7, said floating point emulation algorithm further comprising computing the full calculation of a*b using the integer hardware when mantissa for the result of the multiplication (a*b) requires more mantissa bits than provided for by the floating point hardware.

9. The method of claim 8, said floating point emulation algorithm further comprising:

determining whether the final resulting mantissa of the mantissa(a*b)–the mantissa (c) equals zero;

utilizing the floating point hardware to make the result of the calculation of a*b+c equal to zero when the resulting mantissa is equal to zero; and calculating the remaining parts of the calculation of a*b+c using the integer hardware when the final resulting mantissa is not equal to zero.

10. A computer-readable storage medium having software resident thereon in the form of computer-readable code executable by a computer to perform the following steps in the high precision emulation of program code instructions for a subject machine on a target machine including floating point hardware and integer hardware:

determining that operands in instructions of the program code for the subject machine require a higher precision than provided for by the hardware of the target machine; and applying a floating point emulation algorithm to perform intermediate calculations on the operands of the instructions at a higher precision than the precision supported by the hardware of the target machine to produce intermediate values;

wherein at each stage, the intermediate values are tested to determine whether the intermediate values have reached a point at which the hardware of the target machine has enough precision to finish the calculation without loss of accuracy, such that when it is determined based upon the intermediate calculations that the floating point hardware of the target machine provides sufficient precision to finish the calculations required by the instructions without loss of accuracy, the floating point hardware on the target machine is utilized to finish the calculations; and the integer hardware on the target machine is utilized to perform calculations not selected to be performed by the floating point hardware.

11. The computer-readable storage medium of claim 10, wherein the program code instructions are accumulated instructions that are calculated at a higher precision than the operands capable of being handled by the target machine.

12. The computer-readable storage medium of claim 11, wherein the program code instructions are floating point accumulated instructions of the form: $d=\pm(a*b+c)$, wherein a, b, c and d are operands expressible as floating point numbers.

13. The computer-readable storage medium of claim 12, said computer-readable code further executable for identifying whether any of the operands (a, b, or c) are special values having a known result that all compatible hardware will produce regardless of the level of precision of said compatible hardware.

14. The computer-readable storage medium of claim 13, wherein said special values include either zero, infinity, or NaN (not a number), wherein the floating point hardware is utilized to calculate the result of the accumulated instructions when any of the operands (a, b, or c) are identified as special values.

15. The computer-readable storage medium of claim 12, wherein said floating point emulation algorithm further comprises:

determining whether the exponent for the result of the multiplication of (a*b) overlaps with the exponent of c; and utilizing the floating point hardware to calculate the result of the accumulated instructions when the exponent for the result of the multiplication of (a*b) fails to overlap with the exponent of c.

16. The computer-readable storage medium of claim 15, wherein, when the exponent for the result of the multiplication of (a*b) overlaps with the exponent of c, said floating point emulation algorithm further comprises:

determining whether the mantissa for the result of the multiplication (a*b) requires more mantissa bits than provided for by said floating point hardware; and utilizing the floating point hardware to calculate the result of the accumulated instructions when the result of the multiplication (a*b) does not require more mantissa bits than provided for by the floating point hardware.

17. The computer-readable storage medium of claim 16, said floating point emulation algorithm further comprising computing the full calculation of a*b using the integer hardware when mantissa for the result of the multiplication (a*b) requires more mantissa bits than provided for by the floating point hardware.

18. The computer-readable storage medium of claim 17, said floating point emulation algorithm further comprising:

determining whether the final resulting mantissa of the mantissa(a*b)−the mantissa (c) equals zero;

utilizing the floating point hardware to make the result of the calculation of a*b+c equal to zero when the resulting mantissa is equal to zero; and calculating the remaining parts of the calculation of a*b+c using the integer hardware when the final resulting mantissa is not equal to zero.

19. A system for providing a target computing environment comprising:

a target processor including floating point hardware and integer hardware; and translator code for performing high precision emulation of program code instructions for a subject machine on a target machine, said translator code comprising code executable by said target processor for performing the following steps:

determining that operands in instructions of the program code for the subject machine require a higher precision than provided for by the hardware of the target machine; and applying a floating point emulation algorithm to perform intermediate calculations on the operands of the instructions at a higher precision than the precision supported by the hardware of the target machine to produce intermediate values;

wherein at each stage, the intermediate values are tested to determine whether the intermediate values have reached a point at which the hardware of the target machine has enough precision to finish the calculation without loss of accuracy, such that when it is determined based upon the intermediate calculations that the floating point hardware of the target machine provides sufficient precision to finish the calculations required by the instructions without loss of accuracy, the floating point hardware on the target machine is utilized to finish the calculations; and the integer hardware on the target machine is utilized to perform calculations not selected to be performed by the floating point hardware.

20. The system of claim 19, wherein the program code instructions are accumulated instructions that are calculated at a higher precision than the operands capable of being handled by the target machine.

21. The system of claim 20, wherein the program code instructions are floating point accumulated instructions of the form: d=±(a*b±c), wherein a, b, c and d are operands expressible as floating point numbers.

22. The system of claim 21, wherein said floating point emulation algorithm comprises identifying whether any of the operands (a, b, or c) are special values having a known result that all compatible hardware will produce regardless of the level of precision of said compatible hardware.

23. The system of claim 22, wherein said special values include either zero, infinity, or NaN (not a number), wherein the floating point hardware is utilized to calculate the result of the accumulated instructions when any of the operands (a, b, or c) are identified as special values.

24. The system of claim 21, wherein said floating point emulation algorithm further comprises:

determining whether the exponent for the result of the multiplication of (a*b) overlaps with the exponent of c; and utilizing the floating point hardware to calculate the result of the accumulated instructions when the exponent for the result of the multiplication of (a*b) fails to overlap with the exponent of c.

25. The system of claim 24, wherein, when the exponent for the result of the multiplication of (a*b) overlaps with the exponent of c, said floating point emulation algorithm further comprises:

determining whether the mantissa for the result of the multiplication (a*b) requires more mantissa bits than provided for by said floating point hardware; and utilizing the floating point hardware to calculate the result of the accumulated instructions when the result of the multiplication (a*b) does not require more mantissa bits than provided for by the floating point hardware.

26. The system of claim 25, said floating point emulation algorithm further comprising computing the full calculation of a*b using the integer hardware when mantissa for the result of the multiplication (a*b) requires more mantissa bits than provided for by the floating point hardware.

27. The system of claim 26, said floating point emulation algorithm further comprising:

determining whether the final resulting mantissa of the mantissa(a*b)−the mantissa (c) equals zero;

utilizing the floating point hardware to make the result of the calculation of a*b+c equal to zero when the resulting mantissa is equal to zero; and calculating the remaining parts of the calculation of a*b+c using the integer hardware when the final resulting mantissa is not equal to zero.

* * * * *